United States Patent
Christensen et al.

(10) Patent No.: US 6,360,336 B1
(45) Date of Patent: Mar. 19, 2002

(54) COMPUTER CONTINUOUS DIAGNOSIS AND MAINTENANCE USING SCREEN SAVER PROGRAM

(75) Inventors: Alan Christensen; Bill Bain, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/233,928

(22) Filed: Jan. 20, 1999

(51) Int. Cl.$^7$ ................................................ G06F 11/30
(52) U.S. Cl. ........................................ 714/47; 714/25
(58) Field of Search ............................ 714/25, 34, 37, 714/47; 709/103; 710/267

(56) References Cited

U.S. PATENT DOCUMENTS

| | | | |
|---|---|---|---|
| 4,393,491 A | | 7/1983 | Ashlock et al. |
| 4,722,005 A | | 1/1988 | Ledenbach |
| 5,331,560 A | * | 7/1994 | Tamura ........................ 701/115 |
| 5,678,034 A | | 10/1997 | Chew |
| 5,680,535 A | | 10/1997 | Harbin et al. |
| 6,189,114 B1 | * | 2/2001 | Orr .............................. 714/25 |

OTHER PUBLICATIONS

Symantec, "Symantec Anounces Norton Utilities 3.0 for Windows 95", Nov. 10, 1997, Internet site: www.symantec.com (search title).*

Symantec, "Scheduler Cannot Run Until Screensaver Is Deavtivated", Dec. 3, 1998, Internet site: www.symantec.com (search title).*

Symantec, "Scheduled Scans Are Not Run When Using A Screen Saver", Jan. 24, 2000, Internet site: www.symantec.com (search title).*

Symantec, "Scheduled LiveUpdate Does Not Occur When Screen Saver Is Active", Aug. 5, 1999, Internet site: www.symantec.com (search title).*

Symantec, "Default Wait Period On Idle Scans", Apr. 1, 2001, Internet site; www.symantec.com (search title).*

Symantec, "NetWare Server Abends If Norton AntiVirus Detects A Virus While The Screen Saver Is Active", Apr. 2, 2001, Internet site: www.symantec.com (search title).*

"Cachesaver", St. Clair Software, www.stclairsw.com/cachesaver/index.html. Aug. 1998.

* cited by examiner

Primary Examiner—S T. Baderman
(74) Attorney, Agent, or Firm—Haynes and Boone, LLP

(57) ABSTRACT

A method and system of continuous diagnosis and maintenance of a personal computer for a computer having a screen saver program and a list of diagnosis/maintenance activities stored in its memory. The method includes the steps of a) activating a diagnosis/maintenance program if the computer has been idle for a determined period of time, b) beginning diagnosis testing and maintenance, c) if the screen saver deactivates, and if the diagnosis/maintenance activity step is not critical, then ceasing diagnosis testing and maintenance, and d) if the diagnosis/maintenance activity step is critical, then finishing the diagnosis/maintenance activity step, and logging the results.

12 Claims, 2 Drawing Sheets

COMPUTER CONTINUOUS DIAGNOSIS AND MAINTENANCE USING SCREEN SAVER PROGRAM

TECHNICAL FIELD

This invention relates to the field of computer programs, and, more particularly, to a computer diagnosis and maintenance program, incorporated in a screen saver program, that performs diagnoses and routine maintenance when the screen saver activates.

BACKGROUND OF THE INVENTION

Computers often develop software and/or hardware problems because the user fails to periodically run diagnosis and maintenance programs to detect and correct such problems. Typically, computer users fail to run diagnoses and maintenance programs because of the inconvenience and time needed to run such programs. Therefore, what is needed is a diagnosis and maintenance program that will periodically perform diagnoses and routine maintenance without inconveniencing the user.

SUMMARY

The present invention is a method and system of continuous diagnosis and maintenance of a personal computer for a computer having a screen saver program and a list of diagnosis/maintenance activities stored in its memory, comprising the steps of a) activating a diagnosis/maintenance program if the computer has been idle for a determined period of time, b) beginning diagnosis testing and maintenance, c) if the screen saver deactivates, and if the diagnosis/maintenance activity step is not critical, then ceasing diagnosis testing and maintenance, and d) if the diagnosis/maintenance activity step is critical, then finishing the diagnosis/maintenance activity step, and logging the results.

DETAILED DESCRIPTION OF THE PREFERRED EMBODIMENT

Figure 1:
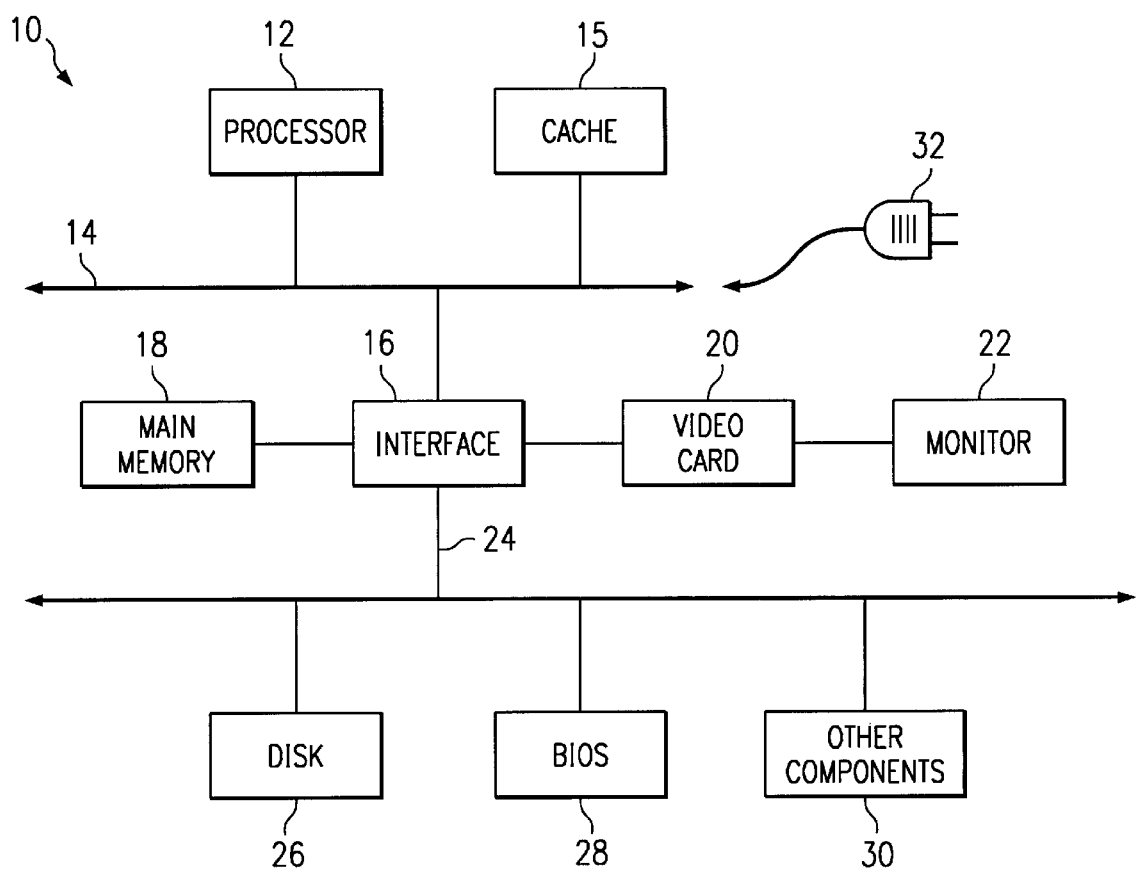
FIG. 1 is a block diagram of one embodiment of a computer including several different components, buses and bus interfaces.

Referring to FIG. 1, the reference numeral 10 designates, in general, a computer for implementing several different embodiments. The computer 10 is illustrated with many different components, it being understood that some or all of the components may be used in various embodiments. Actual component types are also discussed only the sake of example, it being further understood that a wide variety of substitution is expected for different embodiments.

The computer 10 includes a processor 12, which may for example be one capable of supporting an operating system such as Windows 98 from Microsoft Corporation of Redmond, Wash. The processor 12 connects to a local bus 14 for accessing one or more components, including cache memory 15 and a memory interface 16. The memory interface 16 is used for accessing a main memory 18 and a video card 20, which in turn is used for driving a video device 22. The memory interface 16 also interconnects the local bus 14 with one or more peripheral buses, such as a PCI bus, an industry standard architecture ("ISA") bus, and/or an integrated drive electronics ("IDE") bus, designated generally as peripheral bus 24.

The peripheral bus 24 connects to one or more peripheral devices, such as a hard disk drive 26, a storage of basic input/output system ("BIOS") code 28 and several other components, designated generally as component 30. The component 30 may perform different routines, such as advanced power management, by monitoring consumption of computer power from a power supply 32. The hard disk drive 26 is capable of storing one or more programs that may be performed by the processor 12, the video card 20, or other components of the computer 10. One of the programs stored in the hard disk drive 26 is a combined screen saver and diagnosis/maintenance program.

Figure 2:
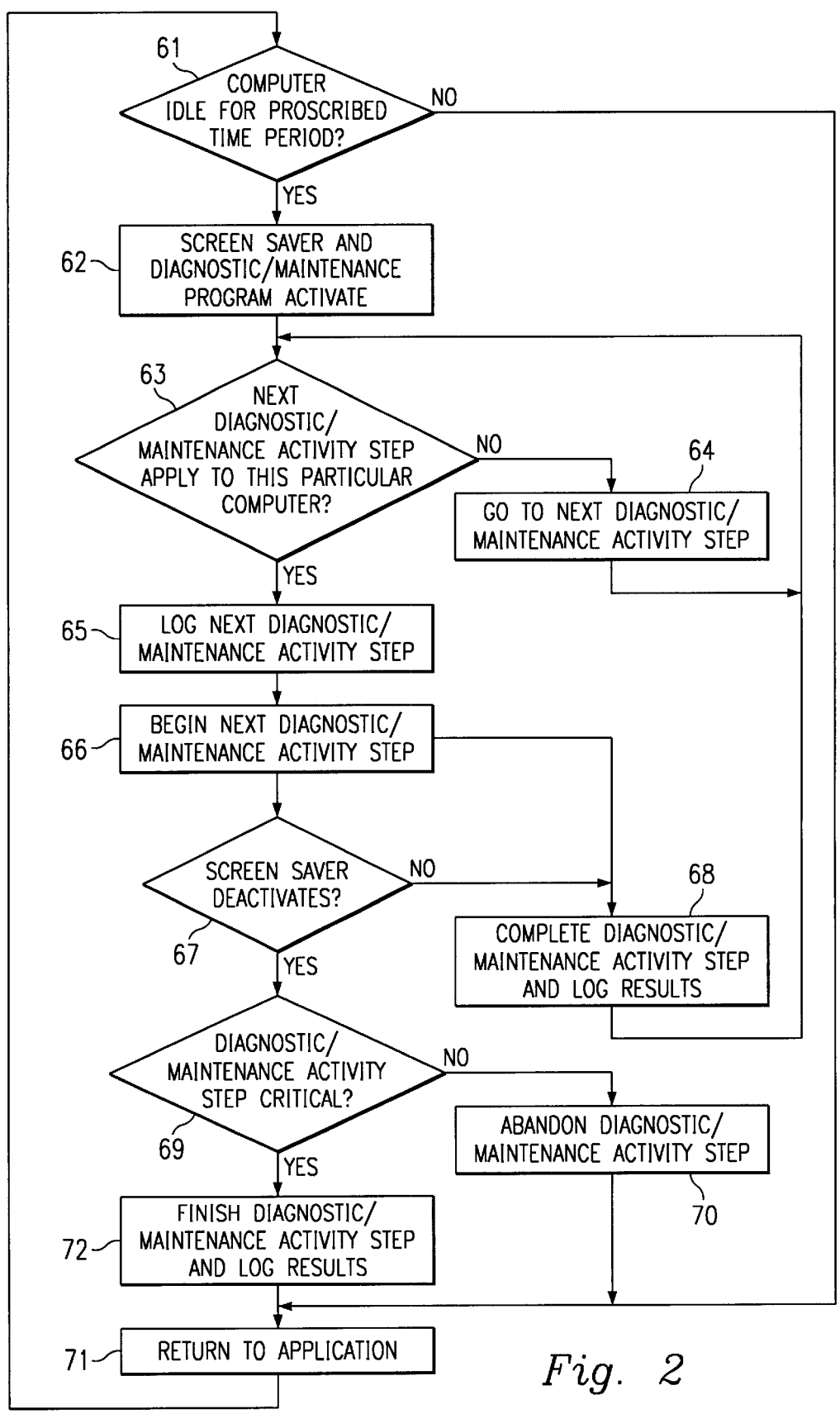
FIG. 2 is a flow chart depicting a method of the preferred embodiment to be performed on the computer of FIG. 1.

Referring to FIG. 2, in step 61, the combined screen saver and diagnosis/maintenance program loops in a routine until the computer is idle for the proscribed time period. If the computer is idle for the proscribed time period, then, in step 62, the combined screen saver and diagnosis/maintenance program activates. In step 63, the diagnosis/maintenance program queries whether the next diagnosis/maintenance activity step applies to the particular computer. If the next diagnosis/maintenance activity step does not apply to the particular computer, then, in step 64, the diagnosis/maintenance program proceeds to the next diagnosis/maintenance activity step, and returns to the question in step 63. In step 63, if the next diagnosis/maintenance activity step does apply to the particular computer, then, in step 65, the diagnosis/maintenance program logs the next diagnosis/maintenance activity step. In step 66, the diagnosis/maintenance program begins diagnosis testing or maintenance. In step 67, the diagnosis/maintenance program queries whether the screen saver deactivates. If the screen saver does not deactivate, then, in step 68, the diagnosis/maintenance program finishes the current diagnosis/maintenance activity step, and logs the results. The diagnosis/maintenance program then returns to the question in step 63. In step 67, if the screen saver does deactivate, then, in step 69, the diagnosis/maintenance program queries whether the interrupted diagnosis/maintenance activity step is critical. If the diagnosis/maintenance activity step is not critical, then, in step 70, diagnosis testing or maintenance ceases. In step 71, the program returns control to the application. In step 9, if the diagnosis/maintenance activity step is critical, then, in step 72, the diagnosis/maintenance program finishes that diagnosis/maintenance activity step, logs the results, and goes to step 71.

In step 71, upon return to the application, the program returns to step 61, in which the combined screen saver and diagnosis/maintenance program again loops in a routine until the computer is idle for the proscribed time period. Upon reactivation of the combined screen saver and diagnosis/maintenance program, diagnosis testing or maintenance resumes at the diagnosis/maintenance activity step where diagnosis testing or maintenance ceased during previous diagnosis testing or maintenance.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A computer system comprising:

a processing device;

a storage device connected to the processing device;

one or more diagnosis/maintenance activities stored in the storage device; and a screen saver program capable of continuous diagnosis and maintenance of one or more components in the computer, the screen saver program comprising instructions for:

activating a diagnosis/maintenance program if the processing device has been idle for a determined period of time;

beginning one of the diagnosis/maintenance activities;

detecting a deactivation of the screen saver program;

ceasing the diagnosis/maintenance activity upon deactivation detection, if the diagnosis/maintenance activity is not critical;

finishing the diagnosis/maintenance activity upon deactivation detection, if the diagnosis/maintenance activity is critical; and logging the results of the diagnosis/maintenance activity.

2. The computer of claim 1, wherein the screen saver program further comprises:

determining if the computer has been idle for a determined period of time.

3. The computer of claim 1, wherein the screen saver program further comprises:

determining if a next listed diagnosis/maintenance activity applies to the computer.

4. The computer of claim 3, wherein the screen saver program further comprises:

logging the next diagnosis/maintenance activity step after performing the instruction for determining if the next listed diagnosis/maintenance activity applies to the computer.

5. A method of continuous diagnosis and maintenance of a personal computer, the personal computer having a screen saver program and a list of diagnosis/maintenance activities stored in its memory, the method comprising the steps of:

activating a diagnosis/maintenance program if the computer has been idle for a determined period of time;

beginning a diagnosis/maintenance activity;

if the screen saver deactivates, and if the diagnosis/maintenance activity step is not critical, then ceasing diagnosis/maintenance activity; and if the diagnosis/maintenance activity step is critical, then finishing the diagnosis/maintenance activity step, and logging the results.

6. The method of claim 5, further comprising, after the step of beginning a diagnosis/maintenance activity, the step of if the screen saver deactivates, then querying whether the interrupted diagnosis/maintenance activity step is critical.

7. The method of claim 6, further comprising the step of first determining if the computer has been idle for a determined period of time.

8. The method of claim 7, further comprising, before the step of beginning a diagnosis/maintenance activity, the step of determining if a next listed diagnosis/maintenance activity applies to the computer.

9. The method of claim 8, further comprising, after the step of determining if the next listed diagnosis/maintenance activity applies to the computer, the step of logging the next diagnosis/maintenance activity step.

10. The method of claim 9, further comprising, after the step of beginning a diagnosis/maintenance activity, the step of querying whether the screen saver deactivates.

11. The method of claim 10, further comprising, after the step of querying whether the screen saver deactivates, the step of if the screen saver does not deactivate, then finishing the current diagnosis/maintenance activity step, and logging the results.

12. A method of continuous diagnosis and maintenance of a personal computer, the personal computer having a screen saver program and a list of diagnosis/maintenance activities stored in its memory, comprising the steps of:

a. determining if the computer has been idle for a determined period of time;

b. activating a diagnosis/maintenance program if the computer has been idle for a determined period of time;

c. determining if a next listed diagnosis/maintenance activity applies to the computer;

d. logging the next diagnosis/maintenance activity step;

e. beginning a diagnosis/maintenance activity;

f. querying whether the screen saver deactivates;

g. if the screen saver does not deactivate, then finishing the current diagnosis/maintenance activity step, and logging the results;

h. if the screen saver does deactivate, then querying whether the interrupted diagnosis/maintenance activity step is critical;

i. if the diagnosis/maintenance activity step is not critical, then ceasing diagnosis/maintenance activity; and j. if the diagnosis/maintenance activity step is critical, then finishing the diagnosis/maintenance activity step, and logging the results.

* * * * *